G. R. MOORE.
Sediment Drains.
No. 136,608.
Patented March 11, 1873.
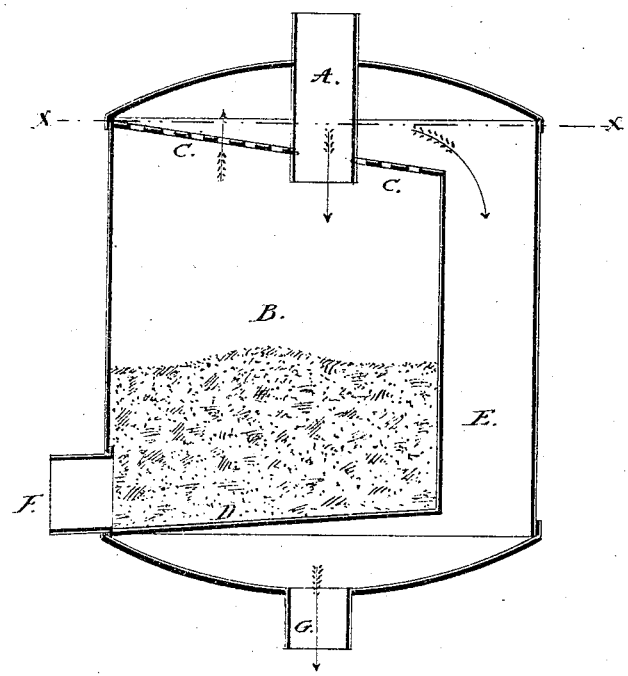
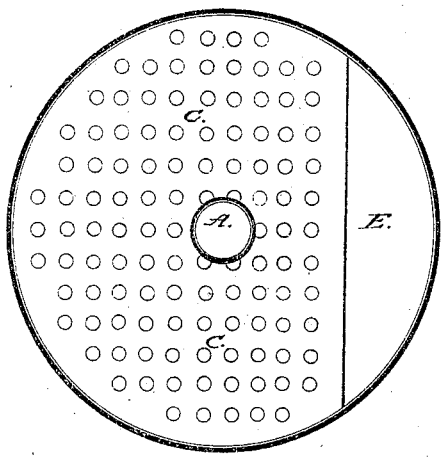
Attest:
R. A. Hyde
H. T. Allen
Inventor:
Geo. R. Moore

UNITED STATES PATENT OFFICE.

GEORGE R. MOORE, OF LYONS, IOWA.

IMPROVEMENT IN SEDIMENT-DRAINS.

Specification forming part of Letters Patent No. 136,608, dated March 11, 1873.

*To all whom it may concern:*

Be it known that I, GEO. R. MOORE, of Lyons, in the county of Clinton and State of Iowa, have invented certain Improvements in Sediment-Drains, of which the following is a specification:

The object of my invention is to prevent the clogging of drain-pipes by a simple apparatus, which may be made as a distinct article of manufacture, if desired, and attachable to any sink, stationary wash-bowl, or other vessel where it may be needed.

Figure 1 is a vertical transverse section taken centrally. It shows all the parts and the arrangement of parts.

A is the inlet; B, the sediment receptacle and container. C is a strainer placed above the bottom of the inlet-pipe so as to intercept any floating hard substances passing upward out of B, through it to E and G, as shown by the arrows. D is the bottom of the sediment-retainer B. E is the passage to the outlet or regular drain-pipe G. F is the cleaning-out aperture, which may be closed by a cork or any other stopper desired. G is the outlet or point of connection with the regular drain-pipe.

Fig. 2 is a top view with the top portion of the casing removed.

Same letters indicate same parts.

I claim as my invention—

1. The strainer C, or its equivalent, placed above the bottom of the inlet-pipe, substantially as and for the purpose herein set forth.

2. The arrangement of the several parts A, B, C, E, F, and G, as herein shown.

GEO. R. MOORE.

Witnesses:
RD. A. HYDE,
A. R. ALLEN.